(12) United States Patent
Fukushima et al.

(10) Patent No.: US 6,287,649 B1
(45) Date of Patent: Sep. 11, 2001

(54) LIQUID CRYSTAL DISPLAY DEVICE AND METHOD OF MANUFACTURING IT

(75) Inventors: Hitoshi Fukushima; Kanemitsu Kubota, both of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/098,521

(22) Filed: Jun. 17, 1998

(30) Foreign Application Priority Data

Jun. 26, 1997 (JP) .................................................... 9-170370

(51) Int. Cl.$^7$ ............................ G02F 1/1337; B05D 5/00
(52) U.S. Cl. ............................ 428/1.2; 428/201; 428/209; 349/123; 349/124; 349/128; 349/129; 427/282; 427/553; 430/320
(58) Field of Search ................................ 428/1, 1.2, 1.21, 428/201, 209; 349/1, 58, 112, 123, 130, 132, 124, 125, 128, 129, 190; 430/20, 320; 427/259, 282, 287, 553

(56) References Cited

U.S. PATENT DOCUMENTS

| | | | |
|---|---|---|---|
| 4,883,344 | * 11/1989 | Okada et al. | 350/339 |
| 4,902,104 | * 2/1990 | Ponjee et al. | |
| 5,026,144 | * 6/1991 | Taniguchi et al. | 350/350 |
| 5,578,351 | 11/1996 | Shashidhar et al. | 428/1 |
| 5,596,434 | 1/1997 | Walba et al. | |
| 5,909,266 | * 6/1999 | Matsuo et al. | 349/187 |

FOREIGN PATENT DOCUMENTS 63-271233   11/1988   (JP) .
2-3-52843   8/1991   (JP) .

OTHER PUBLICATIONS

Using Isoptropic, Nematic, and Smectic Fluids for the Study of Self–Assembled Monolayers Formed from Alkanethiols on Gold, Gupta, V.K., Chem. Mater., vol. 8, 1996, pp. 1366–1369. (No Month).
R. A. Drawhorn et al., "Anchoring of Nematic Liquid Crystals on Self–Assembled Monolayers Formed from Alkanethiols on Semitransparent Films of Gold," J. Phys. Chem. 1995, vol. 99, No. 45, pp. 16511–16515. (No Month).
Ralf G. Nuzzo et al., "Adsorption of Bifunctional Organic Disulfides on Gold Surfaces," J. Am. Chem. Soc. 1983, vol. 105, pp. 4481–4483. (No Month).
A. Ulman, "Monolayers of Alkanethiols on Gold," Academic Press, 1991, pp. 279–296. (No Month).

* cited by examiner

*Primary Examiner*—Marie Yamnitzky
(74) *Attorney, Agent, or Firm*—Oliff & Berridge, PLC.

(57) ABSTRACT

A liquid crystal display device wherein the drive voltage is comparatively low, and the optical scattering performance, optical transmissivity and contrast ratio are higher than in the conventional reflective liquid crystal display device. In a liquid crystal display device (1) constituted by sandwiching a liquid crystal layer (70) between a pair of substrates (10, 60), there are provided a perpendicular alignment film (31) including a monomolecular film formed by molecules of a sulphur compound of straight chain structure on the face of at least one substrate (10) of the substrates on the side of the liquid crystal layer and a horizontal alignment film (32) formed by molecules of sulphur compound of different straight chain structure or a fluorine derivative of cysteine etc. An alignment control film different from conventionally can be provided.

14 Claims, 8 Drawing Sheets

1 : LIQUID CRYSTAL DISPLAY DEVICE

1 : LIQUID CRYSTAL DISPLAY DEVICE

1 : LIQUID CRYSTAL DISPLAY DEVICE

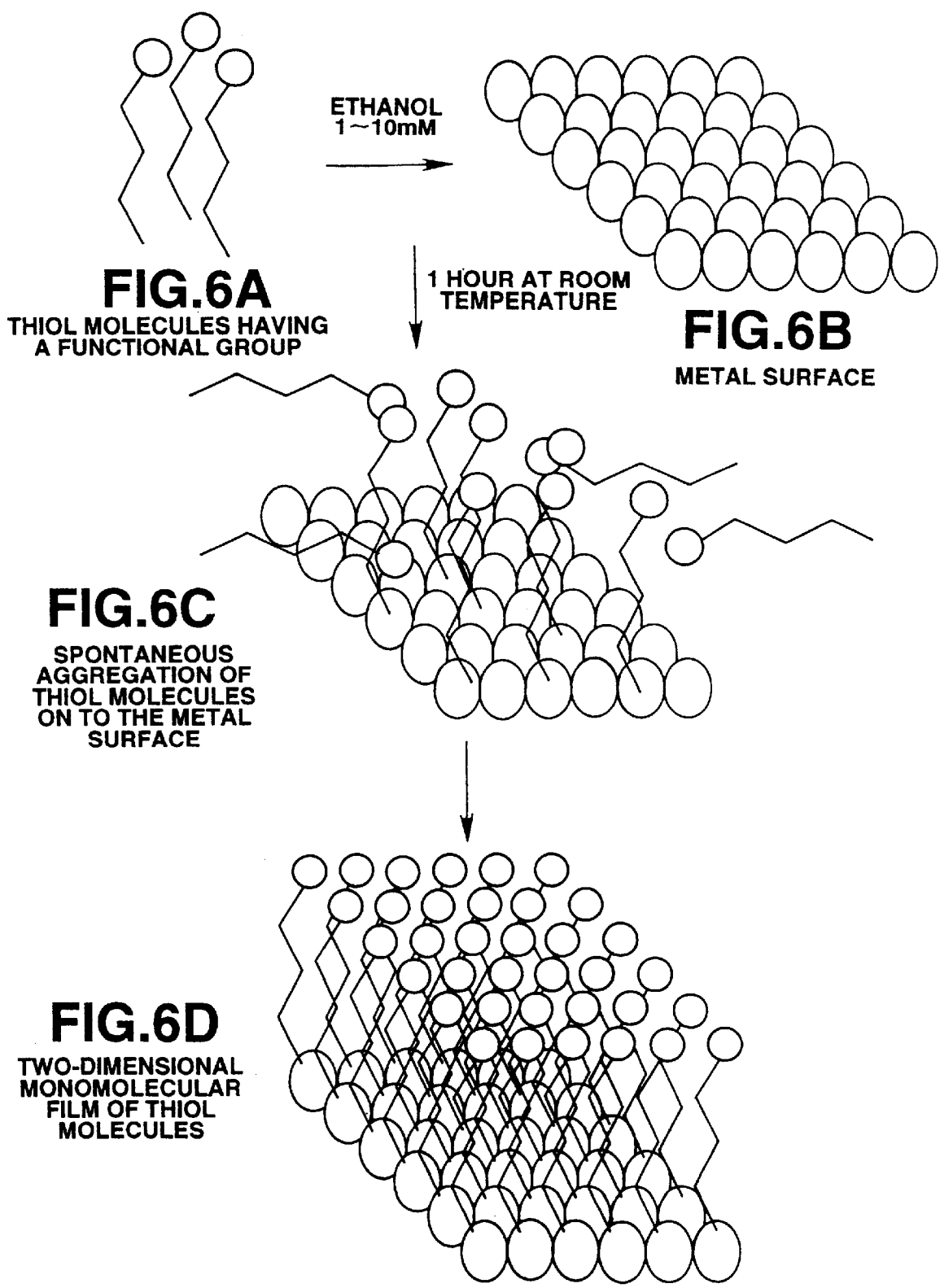

3: LIQUID CRYSTAL DISPLAY DEVICE

4: LIQUID CRYSTAL DISPLAY DEVICE

LIQUID CRYSTAL DISPLAY DEVICE AND METHOD OF MANUFACTURING IT

BACKGROUND OF THE INVENTION

1. Field of the Invention

The present invention relates to a liquid crystal display device and in particular relates to a liquid crystal display device provided with an alignment film whereby satisfactory alignment of the liquid crystal molecules can be achieved.

2. Description of the Related Art

Reflective type liquid crystal display devices are employed as display devices for, for example, watches, desk-top calculators and portable equipment, since they can be operated with very low power. A conventional reflective type liquid crystal display device whereby a bright image can be displayed is disclosed in Japanese Patent Publication No. 52843/1991 and Early Japanese Patent Publication No. 271233/1988. Such liquid crystal display devices are known as polymer diffusion type (PDLC type) liquid crystal display devices and are constructed by sealing a liquid crystal layer constituted by a liquid crystal material consisting of a mixture of polymer resin and a nematic liquid crystal between two substrates. It is arranged that one of the two refractive indices produced by the birefringence possessed by the nematic liquid crystal material coincides with the refractive index of the polymer resin.

When the refractive index of the liquid crystal material when voltage is applied and the refractive index of the polymer resin are made practically the same, in the condition where no voltage is applied between the substrates of the liquid crystal display device, refraction and/or reflection of input light occurs at the interface between the liquid crystal material and the polymer resin material, causing scattering of the input light. This is therefore observed from the outside as cloudy white (white colour).

In contrast, in the condition where voltage is applied between the substrates of the liquid crystal display device, since the refractive index of the liquid crystal material and the refractive index of the polymer resin material are practically the same, no refraction and/or reflection of the incident light occurs, and the incident light is therefore transmitted and is absorbed by the optical absorption layer. This is therefore observed from the outside as black colour. However, a prior art liquid crystal display device as described above suffers from the following inconveniences.

(1) High Drive Voltage

In the prior art liquid crystal display device, voltage division of the applied voltage occurs between the liquid crystal material, which is of comparatively high dielectric constant at 10~15 and the polymer resin material which is of comparatively low dielectric constant of about 3. Since the result of the voltage division is that more voltage is applied where the dielectric constant is lower, only a relatively low voltage is applied to the liquid crystal material. In image display, control is required whereby the long axes of the molecules of the liquid crystal are changed over to the perpendicular direction or horizontal direction of the substrates. If therefore sufficient voltage is applied to control the changeover of the liquid crystal molecules, a high drive voltage of at least about 10 volts must be applied to the liquid crystal display device as a whole. If this is compared with the three volts or so of drive power of a twisted nematic type liquid crystal display device, it can be seen how much power consumption is required by the conventional liquid crystal display device.

(2) Low Degree of Backwards Scattering

The degree of backwards scattering means the ratio of scattered light returning to the observer as a result of the input light being subjected to optical scattering at the liquid crystal layer in the optical scattering condition. Increasing this value increases the brightness of the display.

In conventional liquid crystal display devices, this degree of backwards scattering is at most about 20%. The low brightness of conventional liquid crystal display devices can be seen from the fact that the degree of backwards scattering of the white portions of a newspaper page is about 70%. In order to raise the degree of backwards scattering, the thickness of the liquid crystal layer may be increased or the density of the polymer resin may be raised, but, if these measures are adopted, the drive voltage becomes even higher. To obtain a satisfactory backwards scattering degree, a drive voltage of at least 30 volts is needed, so power consumption is even further increased. The above inconveniences can therefore be eliminated if a reflective liquid crystal display device could be constructed by a construction other than the combined construction of liquid crystal and resin material or if the degree of backwards scattering could be raised without increasing the thickness of the liquid crystal layer and/or the density of the polymer resin.

Having regarding to the above circumstances, according to the present invention a reflective liquid crystal display device is implemented by providing an alignment control film that is different from conventionally.

Specifically, a first task of the present invention is to provide a reflective liquid crystal display device of comparatively low drive voltage without employing a construction combining an liquid crystal material and polymer resin material, and different from the conventional polymer dispersion type liquid crystal display device. Also, a second task of the present invention is to provide a reflective liquid crystal display device wherein there is no attenuation of light such as results from the combined construction described above and wherein the optical scattering performance, optical transmissivity and contrast ratio are improved from conventionally.

Also, a third task of the present invention is to provide a reflective liquid crystal display device wherein the degree of backwards scattering is raised and that is brighter than conventionally without increasing the thickness of the liquid crystal layer and/or increasing the density of the polymer resin material in a combined structure as described above i.e. without raising the drive voltage.

A fourth task of the present invention is to provide a liquid crystal display device and method of manufacturing it provided with an alignment control film that is more resistant to wear than the alignment film employed conventionally and that can be manufactured easily and at low cost.

BRIEF DESCRIPTION OF THE DRAWINGS

FIGS. 6A–6D are diagrams given in explanation of self-integration of thiol molecules of an alignment control film according to the present invention;

DESCRIPTION OF THE PREFERRED EMBODIMENTS

Preferred embodiments for putting the present invention into practice are described below with reference to the drawings.

Embodiment 1

Figure 1:
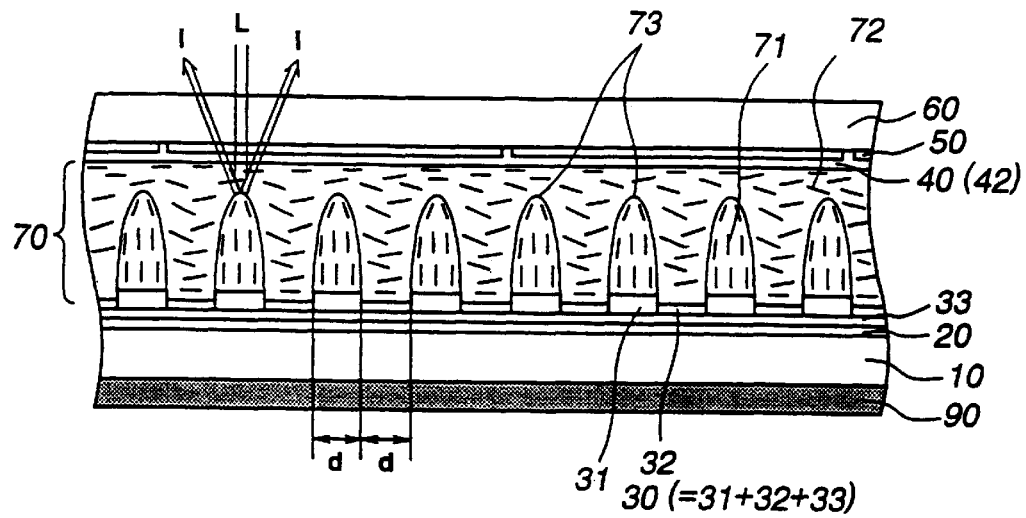
FIG. 1 is a partial cross-sectional view showing the construction of a liquid crystal display device according to the present invention (embodiment 1)

FIG. 1 is a partial cross-sectional view given in explanation of the construction of a liquid crystal display device according to embodiment 1. As shown in this Figure, a liquid crystal display device 1 according to embodiment 1 is constructed by providing a liquid crystal layer 70 between a substrate 10 and substrate 60. Substrate 10 comprises an optical absorption layer 90, a transparent electrode film 20 and an alignment control film 30. Substrate 60 comprises an alignment control film 40 (horizontal alignment film 42) and transparent electrode film 50.

Substrate 10 and substrate 60 are constituted of material such as glass or plastic having suitable mechanical strength and physical and chemical stability and optical transparency. Their thickness is such as to maintain an appropriate degree of mechanical strength while not greatly reducing the intensity of the input light.

Optical absorbing layer 90 is constituted of material that has no optical transparency and absorbs light, such as carbon.

Figure 2:
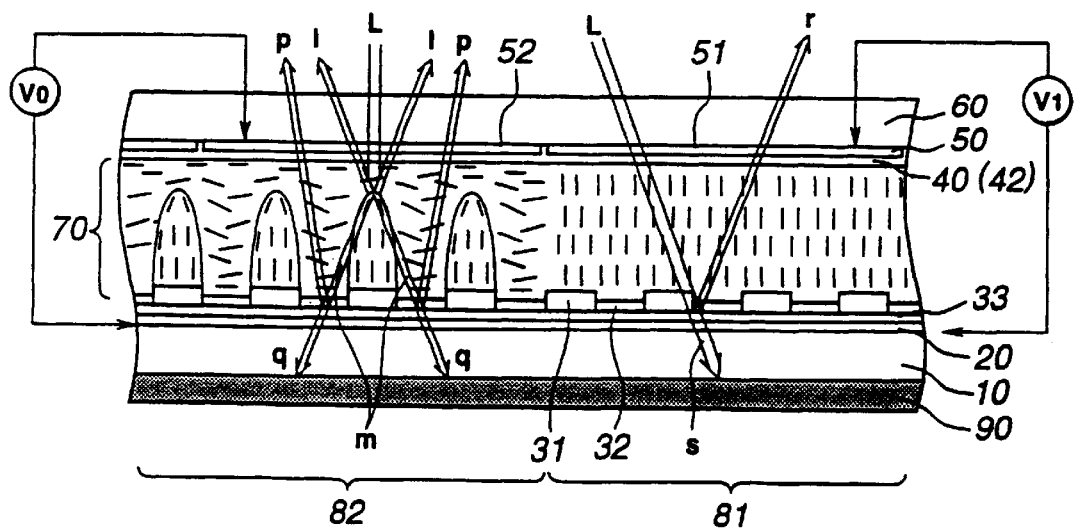
FIG. 2 is a diagram of the principles of operation of a liquid crystal display device according to the present invention (embodiment 1)

Transparent electrode films 20 and 50 are constituted of material having optical transparency and electrical conductivity, such as indium oxide, tin oxide or a mixture of these. Transparent electrode film 20 is a common electrode and so is constituted as a pattern that is electrically connected in common with all of the pixels of this liquid crystal display device. In contrast, transparent electrode film 50 is constituted as a pattern wherein isolation is effected between one pixel and another. For example, as shown in FIG. 2, transparent electrode 51 and transparent electrode 52 are constituted such that they can be driven independently electrically.

Liquid crystal layer 70 is constituted by a liquid crystal material such as a nematic liquid crystal that has dielectric anisotropy and has a complex refractive index. In this case, a nematic liquid crystal material having positive dielectric anisotropy such as for example the liquid crystal material BDH-BL007 manufactured by Merck Inc. is employed. The thickness of the liquid crystal layer should preferably be about 2 $\mu$m~20 $\mu$m in order to provide sufficient scattering of the incident light and little attenuation of the amount of light. Alignment control film 30 relates to the alignment control film of the present invention and comprises a perpendicular alignment film 31, horizontal alignment film 32 and metallic layer 33. Perpendicular alignment film 31 and horizontal alignment film 32 are arranged alternately.

Metallic layer 33 is constituted of chemically and physically stable metal such as gold (Au), silver (Ag), copper (Cu), indium (In), or gallium arsenide (Ga—As). Regarding the film thickness of metallic layer 33, since this is fixed by self-aggregation of sulphur compounds, the thickness of the metallic layer itself can be very thin. This thickness may therefore typically be 20 Å or more.

Perpendicular alignment film 31 is formed by self-aggregation of a single sulphur compound of straight-chain structure on metallic layer 33. In this context, of organic substances containing sulphur (S), "sulphur compound" is a general term for compounds containing one or more thiol functional groups or a disulphide (S—S) bond. Such sulphur compounds, in solution or in a volatilised condition, are spontaneously chemically adsorbed on to a metallic surface such as gold, forming a monomolecular film approximating to a two-dimensional crystalline structure. The molecular film produced by this spontaneous chemical adsorption is called a self-aggregated film, self-structured film or self-assembly film, and the alignment control film 30 of this embodiment corresponds to this. As the sulphur compound, a thiol compound is preferred. In this context, "thiol compound" is a general term for organic compounds having a mercapto group (—SH) (R—SH: where R is a hydrocarbon group such as an alkyl group). Preferred thiol compounds are straight-chain alkane thiols expressed by the compositional formula $C_nH_{2n+2}SH$ (n is a natural number) or fluorinated alkane thiols expressed by $C_nF_{2n+1}C_mH_{2m}SH$ (n and m are natural numbers). For example, the case may be cited wherein n=10 and m=10. The thickness of the perpendicular alignment film 31 depends on the molecular weight of the sulphur compound but is of the order 10~50 Å.

Horizontal alignment film 32 also may be formed as a self-aggregated film, like perpendicular alignment film 31. As the sulphur compounds constituting the horizontal alignment film, a plurality of types of sulphur compound of different straight-chain structure, for example, mixtures of straight-chain alkane thiols of a plurality of types, being alkane thiols $C_nH_{2n+2}SH$, where the numbers n are different, may be cited. An example is a mixture of alkane thiol wherein n=6 and alkane thiol wherein n=16.

Also, as an example of a sulphur compound of non-straight chain structure, a derivative obtained by introducing a fluorine chain into cysteine is desirable. The thickness of the horizontal alignment film 32 depends on the molecular weight of the sulphur compound but may be about 10~30 Å.

The perpendicular alignment film 31 and horizontal alignment film 32 are preferably finely divided and arranged alternately so as to sufficiently scatter the incoming Light. The arrangement may consist in arrangement alternately in the form of stripes, a mosaic arrangement or alternate random arrangement. For example, the unit width (d of FIG. 1) in the substrate direction of the alignment films may be 1 $\mu$m~100 $\mu$m or, taking into consideration manufacturing cost and optical scattering performance, preferably about the same as the thickness of the liquid crystal layer i.e. 4 $\mu$m~15 $\mu$m approximately.

As the alignment control film 40 (horizontal alignment film 42), various types of resin consisting of polymers having resistance to heat and chemical stability, such as polyimides or polyvinyl alcohols may be employed; horizontal alignment may be improved by the known rubbing treatment. It should be noted that, since it is sufficient if this alignment film has a function of aligning the liquid crystal molecules, it could be an alignment film produced by inclined evaporation constituted by inclined evaporation of silicon monoxide on to the substrate, or an alignment film constituted in the same way as in the case of the horizontal alignment film 32 described above. As to the film thickness of horizontal alignment film 42, this should be a thickness such as to produce alignment of the liquid crystal molecules and may for example be set to about 10~200 nm.

In order to raise adhesion between the transparent electrode film 20 and metallic layer 33, it is desirable to provide an intermediate layer constituted by either chromium (Cr), tantalum (Ta) or an alloy of these (such as Ni—Cr) etc. If an intermediate layer is provided, the bonding force between the transparent electrode film and metallic layer is increased, and separation of the sulphur compound in response to mechanical rubbing is made more difficult.

Action

Figure 3:
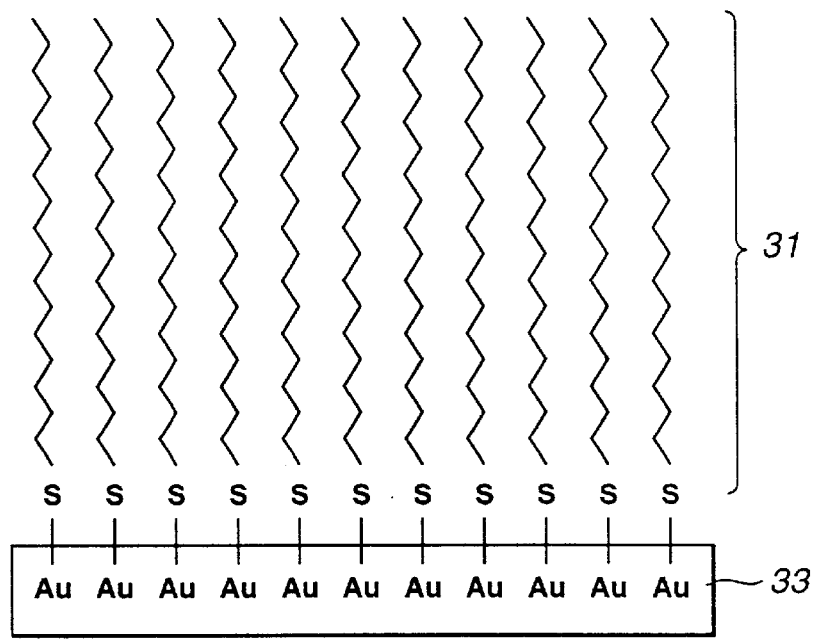
FIG. 3 is a diagram showing how sulphur atoms of a perpendicular alignment film and metal atoms of a metallic layer are coupled.

As shown in FIG. 3, the vertical alignment film 31 of the liquid crystal display device 1 has a two-dimensional structure formed by self-integration by covalent bonding of the straight-chain alkane thiol sulphur atoms (S) to the gold (Au) atoms in the metallic layer 33. The alkane thiol molecules have a straight-chain structure and are bonded inclined at about 16° to 27° with respect to the normal to the surface of the metallic layer. Consequently, the molecular length axes of the liquid crystal molecules that are adjacent to the alkane thiol molecules at this angle also assume a condition in which they are practically erect with respect to the substrate surface. That is, alignment in the perpendicular direction is achieved.

Figure 4:
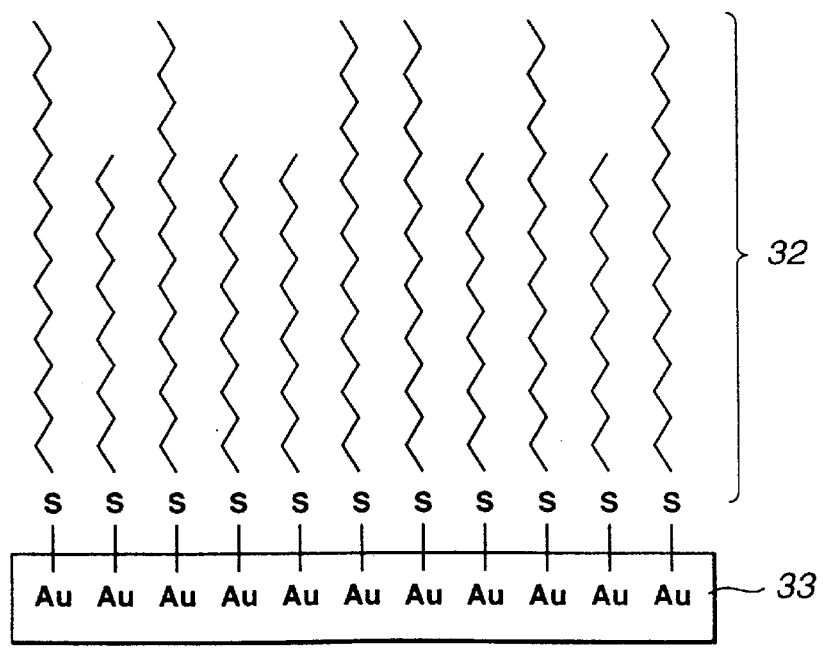
FIG. 4 is a diagram showing how sulphur atoms of a horizontal alignment film and metal atoms of a metallic layer are coupled.
Figure 5A:
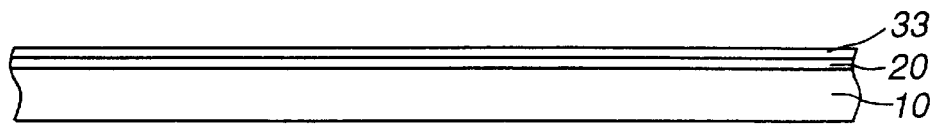
FIGS. 5A–5F are cross-sectional views of a manufacturing step given in explanation of a method of manufacture of a liquid crystal display device according to the present invention.
Figure 5B:
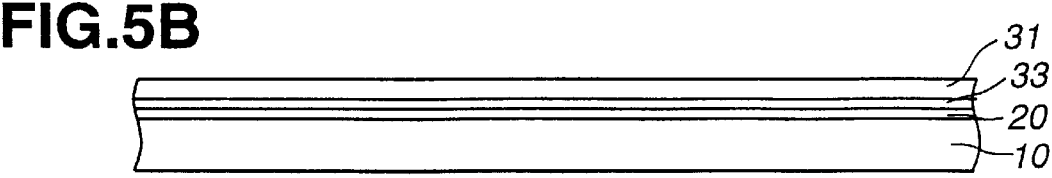
Figure 5C:
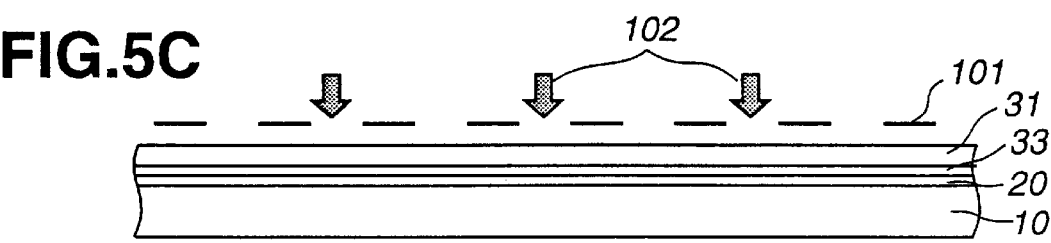
Figure 5D:
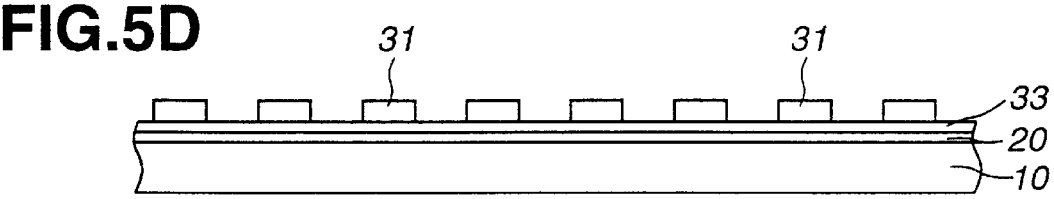
Figure 5E:
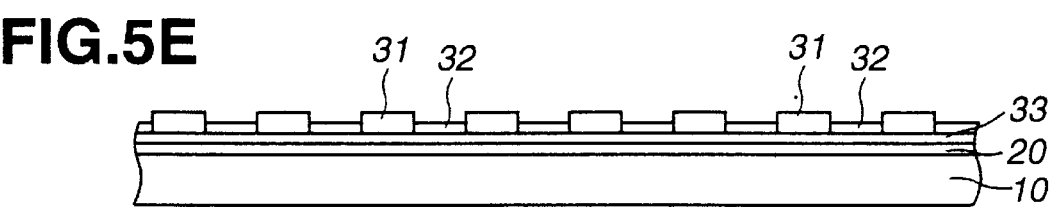
Figure 5F:
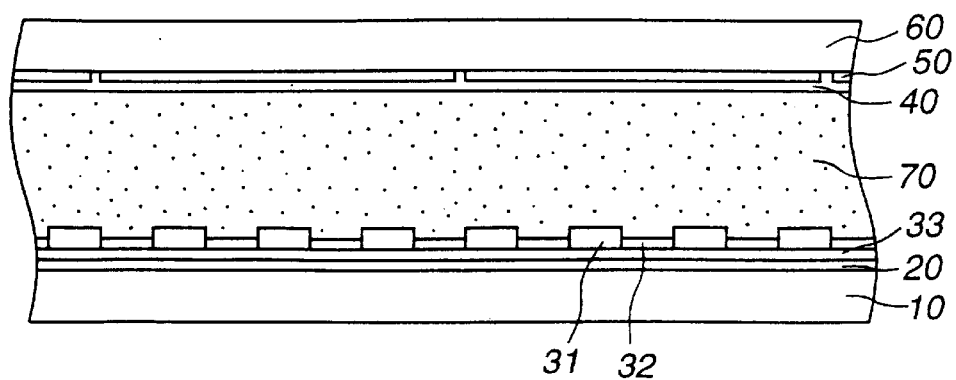

In contrast, as shown in FIG. 4, in the case of the horizontal alignment film 32 of this embodiment, the aggregation force of the molecules that are self-aggregated to the metallic layer is comparatively weak, and, in contrast to the solidified perpendicular alignment film, they constitute a semi-fluid mobile film. Consequently, the liquid crystal molecules that are horizontally aligned by horizontal alignment film 42 on the opposite side show an alignment that is close to parallel with respect to the surface of the substrate without being subjected to vertical alignment by these sulphur compound molecules. In the condition where no voltage is applied, as shown in FIG. 1, due to the difference of alignment of the above liquid crystal molecules in liquid crystal layer 70, a boundary surface 73 is produced between liquid crystal molecules that are perpendicularly aligned and liquid crystal molecules that are horizontally aligned. Since the liquid crystal material has a complex refractive index, a difference of refractive index is produced between the liquid crystal molecule layers that contact boundary surface 73 with different alignments in front of it and behind it. For example, in the case of the liquid crystal material BDH-BL007 mentioned above, the refractive index (n1) in one direction is 1.82, while the refractive index in the other direction (n2) is 1.53, so the birefringence (Δn) of these two is 0.29. With such a construction, display is controlled by either applying or not applying (no voltage: application of V0=0 volts) voltage between the transparent electrode films. That is, as shown in FIG. 2, in the case of a pixel 82 of a transparent electrode 52 where no voltage V0 is applied, a boundary surface 73 is produced due to the difference of alignment of the liquid crystal molecules. When input light L is incident on this boundary surface where there is a difference of refractive index, the scattered input light L refracted and reflected by boundary surface 73 is returned to the front face of liquid crystal display device 1 i.e. towards the observer, so the observer can recognise this pixel 82 as displayed in cloudy white. In addition, of the input light L, the forwardly scattered light m reaches the metallic layer 33, where it is reflected and again passes through liquid crystal layer 70 to constitute rearwardly scattered light p, which reaches the observer. This pixel 82 is therefore displayed to the observer as a brighter white colour. At this point, it will be understood that the intensity of the rearwardly scattered light p that is reflected depends on the reflectivity of metallic layer 33, but, if the thickness of metallic layer 33 is made small, the transmitted light q can be increased by suppressing reflection produced by this metallic layer 33.

In contrast, in the case of a pixel 81 of transparent electrode 51 where a fixed drive voltage V1 (for example 3V) is applied to the liquid crystal molecules, due to the positive dielectric anisotropy of the material of liquid crystal layer 70, because of the electric field produced between the transparent electrodes, all of the liquid crystal molecules are aligned uniformly in a direction practically perpendicular to the substrate. As a result, the refractive index of liquid crystal 70 with respect to the direction of input of the light becomes uniform, and boundary surface 73 disappears. When input light L is input to such a liquid crystal layer 70, the input light L reaches metallic layer 33 without being refracted or reflected. It is there reflected and this reflected light r returns forwards of liquid crystal display device 1, reaching the observer, but, since this light is not subjected to scattering by liquid crystal layer 70, it simply constitutes reflected light produced by the metallic mirror surface, so that the observer sees a reflection of an object in the direction of the input light. If this object is black, pixel 81 is thus displayed as black, and the display contrast ratio is raised. However, if the object is white, the display contrast ratio is lowered. Accordingly, as mentioned above, by increasing the transmitted light s by suppressing reflection by reducing the thickness of metallic layer 33, and by absorbing the light by an underneath optical absorption layer 90, a good black display can be obtained irrespective of the surrounding environment.

Thus, with the present invention, by adjusting the thickness of metallic layer 33, the ratio of the rearwardly scattered light p, reflected light r and transmitted light q, s can be optimised; if it is desired to prioritise brightness of the reflected display, the thickness of metallic layer 33 can be made large, while if it is desired to prioritise blackness of the black display portions, the thickness of metallic layer 33 can be made smaller. In this way, by adjusting the thickness of the metallic layter 33, a reflective liquid crystal display device can be implemented having a desired display appearance. For example, if gold (Au) is employed as metallic layer 33, if the black display is to be prioritized, the thickness should be made below 50 Å; on the other hand, if it is desired in particular to prioritise brightness of the reflection, the thickness should be made at least 100 Å. With a thickness in between these therefore, a reflective liquid crystal display device can be achieved that balances these two. It should be noted that, by making the width of perpendicular alignment film 31 and/or horizontal alignment film 32 small, the amount of scattered light can be increased and a brighter reflective display image can be presented.

Method of Manufacture

A method of manufacturing a liquid crystal display device 1 according to the present invention will now be described with reference to FIG. 5.

Metallic layer formation step (FIG. 5A): a metallic layer 33 is formed on a substrate 10 provided with a transparent electrode film 20. For film deposition, various methods of film deposition could be employed which are capable of forming a thin metallic film of fixed uniform thickness, such as vacuum sputtering, wet plating, or vacuum evaporation. In this case, this metallic layer 33 may also play the role of a display electrode and in this case it can easily be understood that the transparent electrode 20 may be dispensed with. When an intermediate layer is provided between the two layers in order to increase the adhesion of the transparent electrode film 20 and metallic layer 33, this intermediate layer may be formed by vacuum sputtering with a thickness of 20~300 Å of a material such as Cr. Step of forming a perpendicular alignment film (FIG. 5B): next, perpendicular alignment film 31 is formed by self-aggregation of a thiol compound on metallic layer 33 by immersing a substrate on which the metallic layer is formed in a solution of a straight-chain alkane thiol or of a derivative thiol compound produced using fluorine. The principles of self-aggregation of a thiol compound will now be described with reference to FIG. 6. As shown in FIG. 6A, in an alkane thiol, the head portion is a straight-chain alkane ($CnH_{2n+2}$), and the tail portion is constituted by a mercapto group. From this a solution of 0.1~10 mM is obtained by dissolving in ethanol or an organic solvent of good solubility. When a film of metal is immersed in this solution as in FIG. 6B, and left for about 1 hour at room temperature, the thiol compound is spontaneously aggregated on the surface of the metal (FIG. 6C). Thus, a two-dimensional monomolecular film of thiol molecules is formed on the surface of the metal, the metal atoms and the sulphur atoms being coupled by covalent bonding (FIG. 6D).

The immersion conditions are: concentration of thiol compound in the solution 1 mM, temperature of the solution room temperature to 50°, and immersion time 5 minutes to 1 day. During the immersion processing, stirring or circulation of the solution is performed in order for the formation of the thiol compound layer to be performed uniformly. Strict management of the conditions of this process is unnecessary, since provided the surface of the metal is clean, the thiol molecules spontaneously form a monomolecular film by self-aggregation. When the immersion is completed, a monomolecular film of thiol molecules having firm adhesion only to the surface of the metal is formed. Any thiol molecules adhering to portions other than the metal layer are not particularly covalently bonded, so they can easily be washed off by rinsing etc. with ethyl alcohol. Since these thiol molecules are aggregated making an angle of about 16° to 27° in respect to the normal of the substrate surface, they provide a perpendicular alignment film 31.

Masking step (FIG. 5C): an ultraviolet mask 101 is applied to the substrate on which the perpendicular alignment film 31 is formed, and this is irradiated with ultraviolet rays 102. The pitch of mask 101 corresponds to the pitch between perpendicular alignment film regions. If the pitch is small, the degree of cloudiness can be increased, but costs of manufacturing the mask are raised. If the pitch is made large, the degree of cloudiness is lowered, but the costs of manufacturing the mask are reduced. The pitch is determined by a trade-off between the degree of cloudiness required for the liquid crystal display device and manufacturing costs.

When irradiation with ultraviolet rays 102 is performed, the molecular film is oxidised by the ultraviolet rays in the regions of the perpendicular alignment film where the mask is not arranged, i.e. sulphonation is performed.

Removal step (FIG. 5D): the substrate that has been irradiated with ultraviolet rays 102 is washed with pure water, thereby removing the thiol compound from the irradiated portions. The sulphonated thiol compound that is produced by irradiation with the ultraviolet rays dissolves easily in water. In contrast, in the portions that were not irradiated with ultraviolet rays, the sulphur of the thiol compound and the metal of the metallic layer are firmly bonded. Consequently, by washing with pure water, the thiol compound of the portions that have been irradiated with ultraviolet rays can be cleanly removed, exposing the metal layer 33.

Step of forming horizontal alignment film (FIG. 5E): next, substrate 10 that has passed through the removal step is immersed in the mixed solution of alkane thiols of different straight-chain structure or a solution of a compound having a branched structure, such as a derivative of cysteine to which a fluorine chain has been added. In the portions where the perpendicular alignment film has been removed, metallic layer 33 is exposed, so self-integration of the chemical compound takes place on this metallic layer, and a two-dimensional thin film is again formed. In contrast, no new self-aggregation occurs in the regions where the perpendicular alignment film has been left behind without being removed. The aggregation force between the molecules of the sulphur compound where self-integration takes place for the second time is weak, resulting in a semi-fluid soft mobile film. The force aligning the liquid crystal molecules in this region is therefore weak, and it constitutes horizontal alignment film 32. Liquid crystal material sealing-in step (FIG. 5F): a substrate 60 is manufactured by providing a transparent electrode film 50 for each pixel and, additionally, forming an alignment control film 40 (horizontal alignment film 42). Next, this substrate 60 and substrate 10 on which the alignment control film is formed by steps A~E are fixed with their alignment control films facing each other, and liquid crystal material is sealed in between the two substrates. These are produced by the conventional method of manufacturing a liquid crystal display device. Alignment control film 40 is formed by uniformly coating substrate 60 on which a transparent electrode film was formed, using the method of roll-coating resin etc., the spin coating method, or offset printing method etc. so as to form a uniform coating, followed by heat treatment. The horizontal alignment force of the surface of the alignment control film can be further raised by performing alignment processing such as rubbing treatment.

An alignment control film could be provided by a method other than the known polyimide/rubbing treatment etc., according to this embodiment 1 as described above.

An optical scattering condition (cloudy condition) can be implemented when voltage is not applied solely with a liquid crystal material without using a mixture of polymeric resin material and liquid crystal material as in the conventional polymeric dispersion type (PDLC) liquid crystal display device.

Power consumption can therefore also be reduced, since the drive voltage can operate the display with practically the same voltage (about 3 volts or 5 volts) as in the case of a conventional TN type liquid crystal display device.

With the conventional polymer dispersion liquid crystal display device, even when voltage was applied, it was not possible to make the refractive index of the liquid crystal molecules and the refractive index of the polymer resin material coincide for all input light directions, so that some optical scattering still occurred. As a result, a clear black display was not obtained and the display contrast ratio was adversely affected.

Also, according to the present invention, by adjusting the thickness of the metallic layer 33, a desired reflective type liquid crystal display device can be implemented in which a balance is achieved between brightness and the display contrast ratio.

Thus, with the present invention, by adjusting the size of the regions of the perpendicular alignment film and horizontal alignment film, a reflective type liquid crystal display device can be provided with a high degree of backwards scattering in which the optical scattering performance, optical transmissivity and display contrast ratio are improved compared with conventionally.

Also, according to the present invention, since the self-integrated molecular film of thiol compound is more resistant to wear than the conventional alignment film and a rigid monomolecular film can be formed simply by immersion in a solution, a liquid crystal display device and method of manufacturing it can be provided comprising an alignment control film that can be manufactured easily and with low cost.

Embodiment 2

Embodiment 2 of the present invention relates to a liquid crystal display device provided with alignment different from embodiment 1 above.

Figure 7:
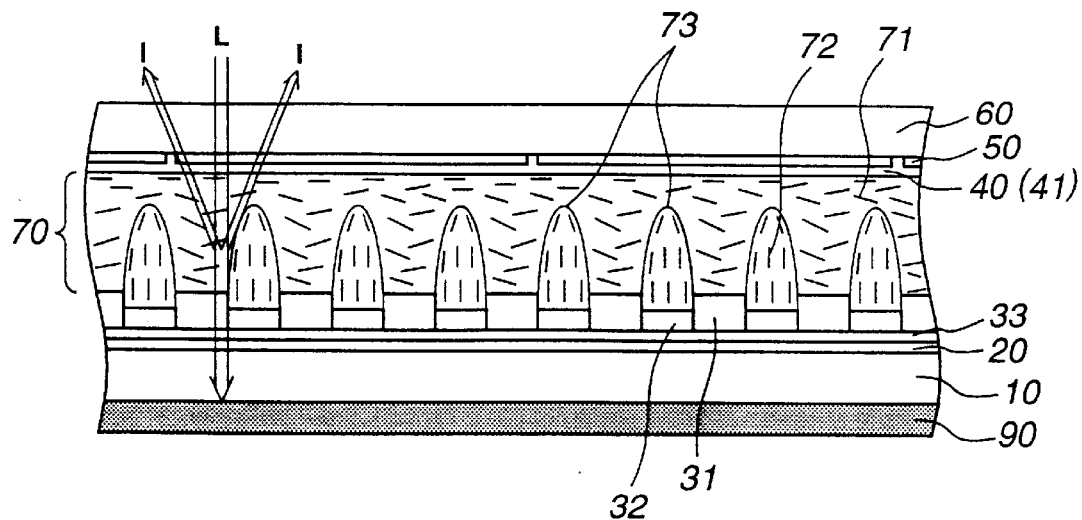
FIG. 7 is a partial cross-sectional view showing the construction of a liquid crystal display device according to the present invention (embodiment 2)

FIG. 7 is a partial cross-sectional view showing the construction of a liquid crystal display device according to embodiment 2. As shown in this Figure, a liquid crystal display device 2 of embodiment 2 is constituted by the provision of a liquid crystal layer 70 between a substrate 10 and a substrate 60.

The point of difference in construction between embodiment 2 and embodiment 1 described above is that, whereas in the case of liquid 10 crystal display device 1 of embodiment 1 a horizontal alignment film 42 was provided as the alignment control film 40, in the case of the present liquid crystal display device 2, a perpendicular alignment film 41 is provided. The rest of the construction is the same as in the case of embodiment 1, so description thereof is omitted. As in the case of embodiment 1, the material of liquid crystal layer 70 has dielectric anisotropy whereby it is aligned in the direction perpendicular to the surface of the substrate when an electrical field is applied. As the material of perpendicular alignment film 41, for example JALS-204 manufactured by Nippon Synthetic Rubber Company Limited may be employed.

Action

Just as in the case of embodiment 1, perpendicular alignment film 31 and horizontal alignment film 32 of this liquid crystal display device 2 provide alignment in the perpendicular direction and alignment in the horizontal direction.

However, since alignment control film 40 of this liquid crystal display device 2 is a perpendicular alignment film 41, liquid crystal molecules in contact with this alignment film are aligned in the perpendicular direction. Consequently, the liquid crystal molecules are aligned uniformly from perpendicular alignment film 31 to perpendicular alignment film 41, but the alignment of the liquid crystal molecules in the vicinity of horizontal alignment film 32 is different from the alignment of the liquid crystal molecules in the vicinity of perpendicular alignment film 41.

Figure 8:
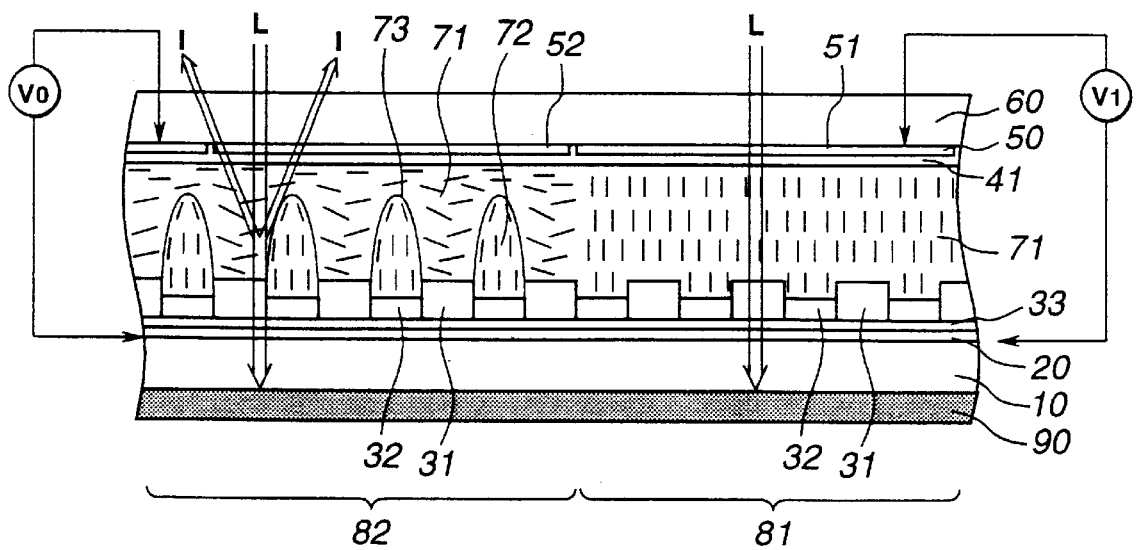
FIG. 8 is a diagram of the principles of operation of a liquid crystal display device according to the present invention (embodiment 2)

Consequently, in the condition where no voltage is applied, due to the difference in alignment of the above liquid crystal molecules in liquid crystal layer 70, as shown in FIG. 7, a boundary surface 78 is formed between the liquid crystal molecules aligned in the perpendicular direction and the liquid crystal molecules aligned in the horizontal direction. Since the material of the liquid crystal has a complex refractive index, a difference in refractive index is produced between the liquid crystal molecular layers that make contact in front of and behind boundary surface 73 with different alignments. With this construction, the display is controlled by applying or not applying (no voltage: application of V0=0 volts) voltage between the transparent electrode films. Specifically, as shown in FIG. 8, in the case of a pixel 82 of transparent electrode 52 where no voltage V0 is applied, due to the difference in alignment of the liquid crystal molecules, a boundary surface 73, is produced. When incoming light L is incident on the boundary surface where there is this difference of refractive index, the incoming light L is refracted and reflected by the boundary surface 73, resulting in scattering.

In contrast, in the case of a pixel 81 of transparent electrode 51 where the fixed drive voltage V1 (for example 3V) is applied, since the material of liquid crystal layer 70 has positive dielectric anisotropy, due to the electrical field generated between the transparent electrodes, all the liquid crystal molecules are aligned uniformly in the approximately perpendicular direction. As a result, the refractive index of liquid crystal layer 70 is uniform with respect to the direction of incidence of the light, and boundary surface 73 therefore disappears. When incoming light L is directed on to such a liquid crystal layer 70, it is directly transmitted without being refracted or scattered. Since the optical scattering condition and transparent condition can thus be changed over by whether or not voltage is applied, by adjusting the thickness of metallic layer 33 in the same way as in embodiment 1 described above, a refractive liquid crystal display device can be obtained that offers both bright white display and clear black display in which there is no optical scattering.

As will be understood from the above principles, display or non-display can be controlled by controlling whether or not voltage is applied.

Method of Manufacture

The method of manufacture of the liquid crystal display device 2 of this invention is the same as in the case of embodiment 1 described above. However, the alignment control film 40 provided on substrate 60 is a perpendicular alignment film 41. For perpendicular alignment film 41, the desired alignment film can be obtained by using a polyimide film having a perpendicular alignment force such as for example JALS-402 manufactured by Nippon Synthetic Rubber Company Limited, as in the prior art method.

As described above, with embodiment 2, even when the direction of alignment of the alignment control film is made different from embodiment 1, a liquid crystal display device can be provided wherein scattering of the incoming light can be achieved solely at the liquid crystal material, by controlling the alignment of the liquid crystal molecules, without using a mixture of liquid crystal material and polymeric resin material as in the liquid crystal display device of the prior art polymeric dispersion type (PDLC). Consequently, since display operation can be achieved with practically the same voltage (about 3 volt to 5 volt) as in the case of a TN type liquid crystal display device, power consumption can also be reduced.

Also, in the same way as in embodiment 1, compared with the conventional polymer dispersion type (PDLC) liquid crystal display device, the transparency of the pixels while voltage is applied is increased, and a clear black display is obtained, thereby also improving the display contrast ratio.

Thus, in this embodiment 2 also, optical scattering can be controlled by adjusting the size of the regions of the horizontal alignment film and perpendicular alignment film, and improved brightness and display contrast ratio can thus be achieved with low voltage and low power drive.

Furthermore, the self-integrated molecular film of thiol compound is more resistant to wear and more stable than the conventional alignment film. Also, since a rigid monomolecular film can be formed simply by immersion in solution, the alignment control film can be manufactured easily and at low cost.

Embodiment 3

Embodiment 3 of the present invention provides a reflective liquid crystal display device wherein optical scattering is improved and which is brighter, without raising the drive voltage or power consumption, by adding the fine perpendicular/horizontal alignment control according to the present invention to a prior art polymer dispersion type (PDLC) liquid crystal display device.

Figure 9:
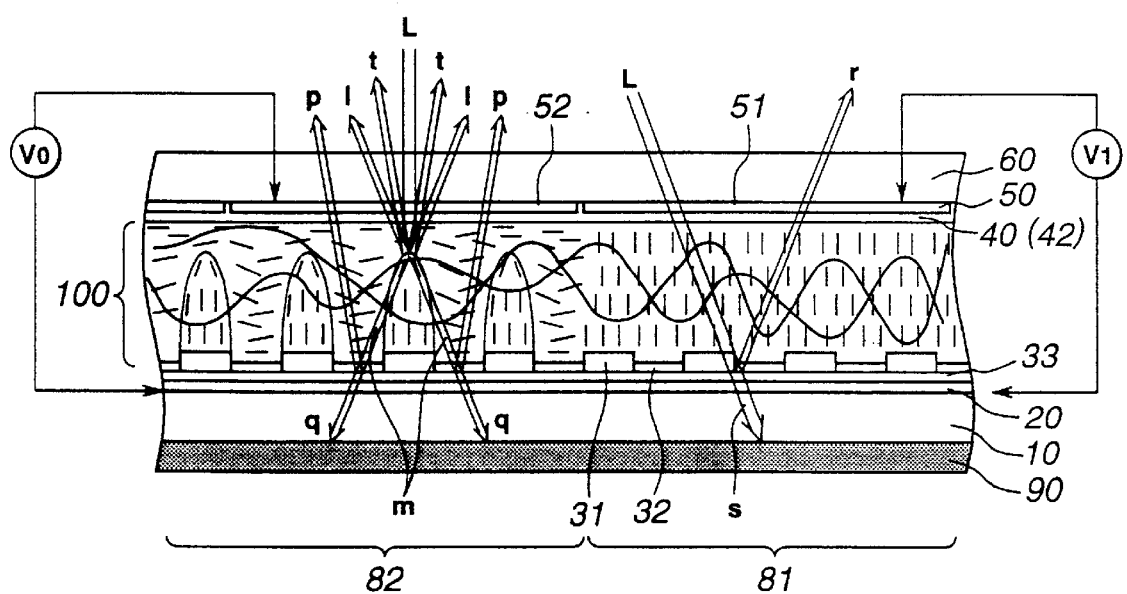
FIG. 9 is a partial cross-sectional view given in explanation of the operation and construction of a liquid crystal display device according to the present invention (embodiment 3)

FIG. 9 is a partial cross-sectional view given in explanation of the construction of liquid crystal display device 3 of embodiment 3. Liquid crystal display device 3 of this embodiment 3 is constituted by providing a liquid crystal layer 100 between substrate 10 and substrate 60.

The difference between the construction of this embodiment 3 and the previous embodiment 1 lies in that, whereas in liquid crystal display device 1 of embodiment 1, a liquid crystal material was solely employed as liquid crystal layer 70, in this embodiment 3, a mixed material consisting of liquid crystal material 101 and polymer resin material 102 is employed for liquid crystal layer 100. The rest of the construction is the same as in embodiment 1 and description thereof is therefore omitted.

The method of forming the liquid crystal layer 100 is that, in the same way as in a conventional polymer dispersion type (PDLC) liquid crystal display device, a mixture of low-molecular weight resin material and liquid crystal material is introduced between two substrates 10, 60 and is then irradiated with light such as ultraviolet rays to effect a cross-linking reaction of the low molecular weight resin material to produce a polymerised resin which is separated and deposited in the liquid crystal material. The materials are chosen beforehand such that the refractive index (np) of the polymeric resin material and one (in this case, n2) of the two refractive indices (n1, n2, n1>n2) of the liquid crystal material showing birefringence approximately coincide (np≈n2).

Action

As described earlier, in the case of a region 82 where low voltage is applied, within liquid crystal layer 100, incoming light L undergoes optical scattering at the boundary surface 73 of the perpendicular alignment region and horizontal alignment regions, producing backwardly scattered light 1 which reaches the observer. In addition, in this embodiment 3, it undergoes optical scattering at the interface between liquid crystal material 101 and polymer material 102, producing backwardly scattered light t, which is returned in the direction of the observer. This is because most constituents of the liquid crystal molecules are directed in the horizontal direction with respect to the surface of substrates 10, 60 so their refractive index is close to n1. Since this is different from the refractive index (np) of the polymeric resin material 102 (np≠n1), optical scattering occurs at the interface.

Thus, in the condition where no voltage is applied, compared with embodiments 1 and 2 described above, stronger optical scattering is obtained due to the addition of backwardly scattered light t. Further, even in comparison with the conventional polymeric dispersion type liquid crystal display device, it can be seen that a stronger optical scattering condition can be achieved without increasing the amount of mixture of polymeric material and so without raising the drive voltage. In contrast, in the case of regions 81 where voltage is applied, the liquid crystal molecules are uniformly aligned practically perpendicularly to the surfaces of substrates 10 and 6, so the alignment boundary surface 73 within the liquid crystal disappears and there is no consequent scattering of input light L. Furthermore, in this condition, the refractive index of the liquid crystal becomes n2, practically coinciding with the refractive index (np) of polymeric resin material 102 (np≈n2), so there is no optical scattering of incoming light L at the interface between the liquid crystal material and the polymeric resin material either. Consequently, in regions 81 where voltage is applied, a transparent condition is produced with practically no optical scattering of incoming light L.

In this way, changeover between a stronger optical scattering condition and a transparent condition is achieved by application/non-application of voltage, so, just as in the case of embodiment 1 described above, by adjusting the thickness of metallic layer 33, a reflective liquid crystal display device can be produced wherein an even brighter white display and black display can be obtained simultaneously.

As described above, with this embodiment 3, stronger optical scattering can be obtained whilst maintaining the same drive voltage and power consumption as in the case of the prior art polymeric dispersion type (PDLC) liquid crystal display device, so a reflective liquid crystal display device can be achieved which is brighter and which has a higher display contrast ratio. Also, since the intensity of the optical scattering is further increased compared with embodiments 1 and 2, a brighter reflective display image can be obtained.

Embodiment 4

Figure 10:
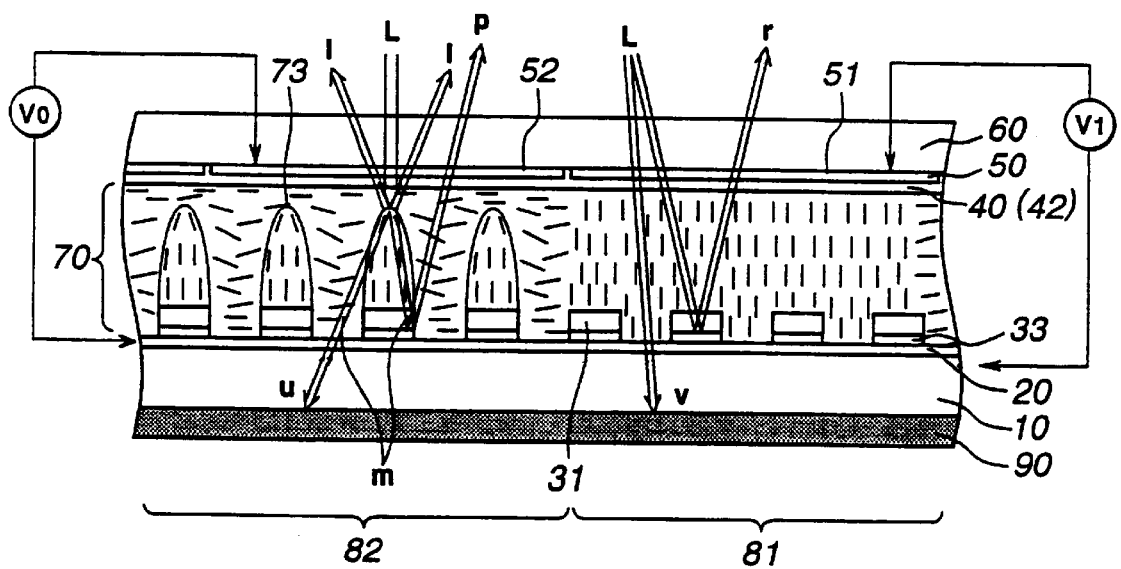
FIG. 10 is a partial cross-sectional view given in explanation of the operation and construction of a liquid crystal display device according to the present invention (embodiment 4)
Figure 11A:
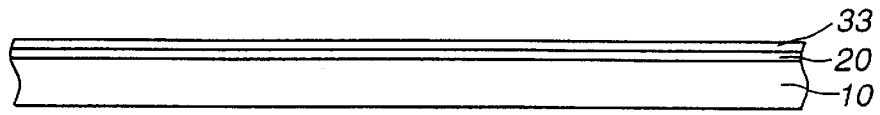
FIGS. 11A–11E are cross-sectional diagrams of a manufacturing step given in explanation of a method of manufacturing a substrate employed in a liquid crystal display device according to the present invention (embodiment 4).
Figure 11B:
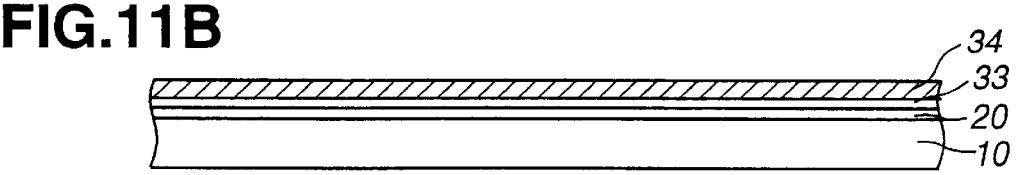
Figure 11C:
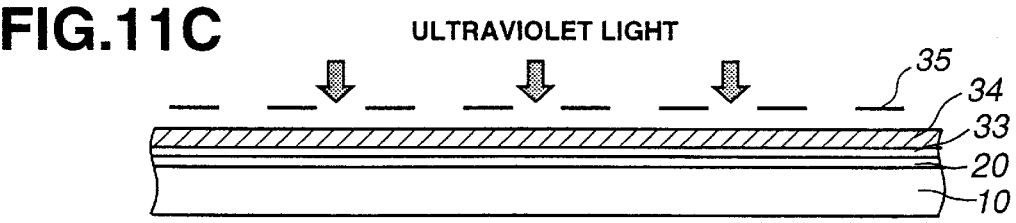
Figure 11D:
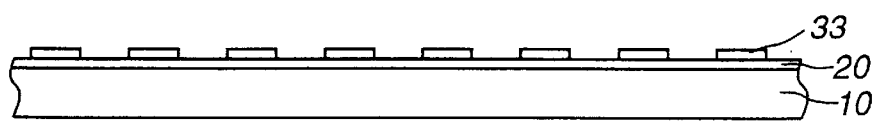
Figure 11E:
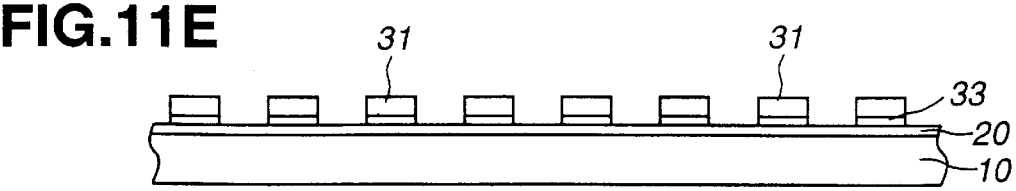

FIG. 10 shows a partial cross-sectional view given in explanation of the construction of a liquid crystal display device according to embodiment 4. As shown in this Figure, the liquid crystal display device 4 of embodiment 4 is constructed by providing a liquid crystal layer 70 between substrate 10 and substrate 60.

The difference in construction between embodiment 4 and embodiment above lies in that whereas in embodiment 1 metallic layer 33 was formed uniformly over practically the en-tire surface of substrate 10, in the present liquid crystal display device 4, it is formed in a partial manner, divided into a large number of minute regions. Apart from this, the construction is the same as that of embodiment 1, so further description thereof is omitted.

Action

In this liquid crystal display device 4, thiol compound that gives perpendicular alignment to the liquid crystal molecules by the same method as in embodiment 1 described above is formed on top of partially formed metallic layer 33. Furthermore, the transparent electrode film 20 is separated in the portions where there is no metallic layer 33. Usually, transparent electrode film 20 consisting of indiumoxide or tin oxide etc. has the capability of arranging liquid crystal molecules parallel to transparent electrode film 20. Consequently, just as in the case of embodiment 1, on the surface of substrate 10, there is a mixture of a large number of minute regions comprising regions in which the liquid crystal molecules are aligned perpendicularly with respect to the surface of substrate 10 and regions in which they are aligned horizontally. With such a construction, the display is controlled by applying or not applying voltage between the transparent electrodes.

Specifically, as shown in FIG. 10, in a region 82 where voltage is not applied, a boundary surface 73 is produced due to the difference of direction of the alignments of the liquid crystal molecules. When incoming light L is directed on to a boundary surface where there is such a difference of refractive indices, as described above, the incoming light L is scattered at boundary surface 73. A part l of the incoming light L that is thus scattered becomes rearwardly scattered light which is returned to the front face of liquid crystal display device 4 i.e. towards the observer and the observer is therefore able to recognise such pixels 82 as cloudy white i.e. as white-coloured display portions. In addition, a part, m, of the forwardly scattered light is reflected by metallic layer 33, forming reflected light p, which is returned to the front face of liquid crystal display device 4. This is therefore recognised by the observer as an even brighter white display.

Forwardly scattered light m that does not reach metallic layer 33 passes through transparent electrode film 20 and substrate 10 to constitute transmitted light u which reaches optical absorption layer 90, where it is absorbed.

In contrast, in the case of a pixel 81 where a fixed drive voltage V1 (for example 3 volts) is applied to the liquid crystal molecules, since the liquid crystal material of liquid crystal layer 70 has positive dielectric anisotropy, due to the electrical field generated between the transparent electrodes, all the liquid crystal molecules are uniformly aligned in a direction approximately perpendicular to the surface of substrate 10. As a result, the boundary surface 73 of refractive index in liquid crystal layer 70 disappears.

Consequently, in the case of pixel 81, incoming light L is transmitted unaltered through the liquid crystal layer 70 without being scattered and light that reaches the metallic layer 33 is reflected there, becoming reflected light r, which reaches the observer. Objects in the direction of the incoming light L are therefore reflected and are visible to the observer. Of the incoming light L, light v that fails to reach the metallic layer 33 passes through transparent electrode film 20 and substrate 10, reaching optical absorption layer 90, where it is absorbed. In this embodiment 4, since the metallic layer 33 that reflects the incoming light is formed in a partial manner, the amount of reflected light r is reduced by half compared with embodiment 1 described above, with the result that a blacker display is obtained and the display contrast ratio is also improved. Furthermore, if, in the same way as in the case of embodiment 1 described above, the thickness of metallic layer 33 is reduced, the reflectivity of this metallic layer 33 is also lowered, so the quality of the black display is further improved and a stable black display is obtained irrespective of the objects in the direction of the incoming light L and the display contrast ratio is also improved.

As described above, with this embodiment 4 also, a display function can be realised by changing over the optical scattering condition and transparent condition by means of whether or not voltage is applied, just as in the case of the prior art polymeric dispersion type (PDLC) liquid crystal display device. However, with the present embodiment, since admixture of polymeric resin such as was performed conventionally is not carried out, the display can be driven with a lower voltage (about 3~5 volt) than with the prior art and, since the degree of optical scattering when voltage is applied is low, a clear black display is obtained and the display contrast ratio can also be improved.

Also, as described above, if the area of metallic layer 33 is halved compared with that of embodiment 1 and the thickness of metallic layer 33 is also reduced, a stable black display can be realised independent of objects in the direct reflection direction of the observer. This is particularly beneficial in the case of liquid crystal display devices for use in portable equipment in which the environment of use is subject to frequent change.

In this embodiment 4, only liquid crystal material having a positive dielectric anisotropy was employed in liquid crystal layer 70 but, just as in the case of embodiment 3, by adding thereto polymeric resin material, it would be possible to further increase the optical scattering, thereby providing the benefit of enabling an even brighter reflective liquid crystal display device to be realised.

Method of Manufacturing

Next, a method of manufacturing a liquid crystal display device 4 according to embodiment 4 will be described using FIG. 11. The characteristic constructional feature of this embodiment 4 is that metallic layer 33 is formed in a partial manner by being divided into a multiplicity of minute regions. The steps other than the step of formation of this metallic layer 33 (i.e. the step of forming a film by self-aggregation of thiol compound and the step of constructing the liquid crystal display cells) may therefore be considered as identical with those in the method of manufacture of embodiment 1 described above.

Metallic layer formation step (FIG. 11A): metallic film 33 is formed on substrate 10 having a transparent electrode film 20. For the method of film formation, various methods could be employed that are capable of forming a thin film of metal which is uniform and of constant thickness, such as the vacuum sputtering method, wet plating method, or vacuum evaporation method. The film thickness can be determined at will taking into account the reflectivity of the metallic layer and the adhesion of the thiol compound but may be in the range 20~3000 Å. An intermediate layer of chromium etc. may be interposed between the two layers in order to increase the adhesion of transparent electrode film 20 and metallic layer 30.

Photoresist step (FIG. 11B): a photoresist film 34 is obtained by uniformly coating metallic layer 33 with photoresist material by the roll coating method or spin coating method etc., followed by drying for 1 hour at about 80° C.

Exposure step (FIG. 1C): portions that are to be left behind as metallic layer are exposed with ultraviolet light etc. using a patterned mask 35 arranged at the upper surface of substrate 10. Developing, etching and resist removal step (FIG. 11D): the photoresist film in the portions which were not exposed is removed by developer liquid and then the metallic layer in these portions which were removed is removed by etching liquid. Further, the remaining, exposed photoresist film is removed by dissolving with solvent, to obtain a substrate 10 having a metallic layer 33 partially left behind in the form of a multiplicity of minute regions.

Perpendicular alignment film formation step (FIG. 1E): next, a partial perpendicular alignment film 31 is formed by self-aggregation of thiol compound only on metallic layer 33 by immersing substrate 10 on which the above partial metallic layer is formed in a solution containing straight-chain alkane thiol or a derivative thiol compound produced using fluorine.

Subsequent steps to this, the assembly of the liquid crystal display cells, and the step of liquid crystal introduction etc. are the same as in the case of embodiment 1.

As described above, according to the present invention, a partially formed metallic layer 33 and a perpendicular alignment film formed thereon can be formed as films of high stability and reliability.

Other Modifications

The present invention may be applied in various modified ways other than the embodiments described above.

For example, in embodiment 1, an alignment control film comprising both perpendicular alignment film and horizontal alignment film was provided on only one substrate, but it would also be possible to arrange opposite this an alignment control film in which both a perpendicular alignment film and horizontal alignment film are present, on another substrate. In this case, regions where the alignment is the same could be arranged mutually facing each other, or the alignment regions could be offset so that the boundary surfaces are arranged mutually meshing with each other.

Also, the width of the alignment region of the alignment control film (d in FIG. 1) could be made different for the perpendicular alignment film and horizontal alignment film.

Also, although in the above embodiments the liquid crystal layer was constituted by a single composition, it could be mixed with dye molecules. If molecules of dye are mixed with the liquid crystal layer, when voltage is not applied, the dye molecules are directed in all directions along the alignment of the liquid crystal molecules, so scattering and absorption of the light is better. In contrast, when voltage is applied, the boundary surfaces of alignment of the liquid crystal molecules disappear and the dye molecules are also made to conform with this alignment, so there is scarcely any scattering or absorption of light. Consequently, by admixing dye molecules, a liquid crystal display device can be provided that is of high contrast ratio.

Also, a colour liquid crystal display device can be provided by providing primary-colour colour filters on the substrate on the side where the light exits. For example, by providing colour filters of the three primary colours red, green and blue, red pixels, green pixels and blue pixels may be constituted, thus providing pixels for colour display.

Furthermore, the method according to the present invention whereby horizontal alignment and perpendicular alignment are conferred on liquid crystal molecules by employing a metallic layer as underlayer and forming thiol molecules on its upper surface by self-aggregation, by means of the properties of this thiol compound, is particularly useful as a method of alignment of liquid crystal molecules uniformly and with high reliability, being applicable to liquid crystal display devices of various existing types of display mode such as for example TN (twisted nematic) type liquid crystal display devices, VA (vertically aligned) type liquid crystal display devices, IPS (in-plane switching) type liquid crystal display devices, or STN (super-twisted nematic) type liquid crystal display devices and, apart from these, liquid crystal display devices of all modes in which liquid crystal molecules are aligned perpendicularly or horizontally with respect to the substrate surface.

The entire disclosure of Japanese Patent Application NO. 170370/1997 filed on Jun. 26th, 1997 including specification, claims, drawings and summary are incorporated herein by reference in its entirety.

Benefit of the Invention

With the present invention, a liquid crystal display device can be provided which is equipped with an alignment control film that is different from the conventional one.

Specifically, since the present invention does not employ a mixture construction of a liquid crystal and polymeric resin as in the prior art polymeric dispersion type liquid crystal display device, a reflective liquid crystal display device can be provided whose drive voltage is comparatively low.

Also, since, with the present invention, the optical attenuation produced by the mixture construction is absent, a reflective liquid crystal display device can be provided with a high degree of backwards scattering and wherein the optical scattering performance, optical transmissivity and contrast ratio are improved compared with the prior art.

Also, according to the present invention, even when a liquid crystal and polymeric resin mixture structure is employed, a bright reflective liquid crystal display device can be provided wherein the intensity of optical scattering can be increased without raising the drive voltage.

Also, according to the present invention, by giving the metallic film partial reflectivity, a reflective liquid crystal display device can be provided which is even brighter.

Further, according to the present invention, there are provided a liquid crystal display device and method of manufacturing it having an alignment control film that can be manufactured easily and with low cost and is more resistant to wear than the conventional alignment film.

What is claimed is:

1. A liquid crystal display device, comprising:

a pair of substrates; and a liquid crystal layer sandwiched between said pair of substrates;

at least one of said substrates comprising at least two types of monomolecular films formed with sulphur compound molecules on a surface on a side of said liquid crystal layer, wherein one type of said monomolecular films has a perpendicular alignment formed by sulphur compound molecules of straight-chain structure and is formed on a plurality of regions of said substrate surface; and another type of said monomolecular films has a horizontal alignment formed by either sulphur compounds of a plurality of types of different straight-chain structures or a sulphur compound of non-straight chain structure; and is formed on a plurality of regions of said substrate surface other than the plurality of regions where the perpendicular alignment film is provided; wherein the alignments are with respect to the substrates.

2. A liquid crystal display device according to claim 1, wherein:

at least one of said substrates has a metallic layer formed between the substrate and said monomolecular film having perpendicular alignment.

3. The liquid crystal display device according to claim 1, wherein, one of said pair of substrates comprises the monomolecular films, and the other of said pair of substrates is provided with a perpendicular alignment film, whereby the molecular length axes of the liquid crystal molecules contacting a surface of the perpendicular alignment film are aligned perpendicular to the surface on the side of said liquid crystal layer.

4. The liquid crystal display device according to claim 1 wherein, one of said pair of substrates comprises the monomolecular films, and the other of said pair of substrates comprises a horizontal alignment film, whereby the molecular length axes of the liquid crystal molecules adjacent to a surface of the horizontal alignment film are aligned horizontally to the surface on the side of said liquid crystal layer.

5. The liquid crystal display device according to claim 1 wherein said liquid crystal is formed using at least a nematic liquid crystal material.

6. The liquid crystal display device according to claim 1 wherein said liquid crystal layer is formed using a mixed material in which a polymeric resin material is added to at least a nematic liquid crystal material.

7. The liquid crystal display device according to claim 1 wherein the sulphur compound molecules constituting said monomolecular films having the perpendicular alignment are of at least one of straight-chain alkane thiol and fluorinated alkane thiol.

8. The liquid crystal display device according to claim 1 wherein the sulphur compound molecules constituting said monomolecular films having the horizontal alignment are of at least one of a mixture of alkane thiol of a plurality of types of different straight-chain structure, and a fluorine chain introduced cysteine.

9. A method of manufacturing a liquid crystal display device, comprising:

forming a pair of substrates; and forming a liquid crystal layer sandwiched between said pair of substrates;

at least one of said substrates comprising at least two types of monomolecular films formed with sulphur compound molecules on a surface adjacent said liquid crystal layer, wherein one type of said monomolecular films has a perpendicular alignment formed by sulphur compound molecules of straight-chain structure and is formed on a plurality of regions of said substrate surface; and another type of said monomolecular films has a horizontal alignment formed by either sulphur compounds of a plurality of types of different straight-chain structures or a sulphur compound of non-straight chain structure; and is formed on a plurality of regions of said substrate surface other than the plurality of regions where the perpendicular alignment films are provided; wherein the alignments are with respect to the substrates.

10. The method of claim 9, further comprising:

forming a metallic layer on the surface of one substrate adjacent said liquid crystal layer; and immersing the substrate on which said metallic layer is formed in a solution in which a sulphur compound of the straight-chain structure is dissolved, forming the perpendicular alignment film; and forming the liquid crystal layer comprising sealing in liquid crystal material between the substrate where said perpendicular alignment film is formed and the other substrate where an alignment treatment is performed.

11. The method of claim 9, further comprising:

forming a metallic layer on the surface of one substrate, the surface being adjacent said liquid crystal layer; and immersing the substrate where said metallic layer is formed in a liquid in which is dissolved either sulphur compounds of the plurality of types of different straight-chain structures or a sulphur compound of the non-straight chain structure, thereby forming the horizontal alignment film; and forming the liquid crystal layer comprising sealing in liquid crystal material between the substrate where said horizontal alignment film is formed and the other substrate where alignment processing is performed.

12. The method of claim 9, further comprising:

forming a metallic layer on the surface of at least one of said substrates adjacent said liquid crystal layer;

forming the perpendicular alignment film by immersing the substrate where said metallic layer is formed in a solution in which a sulphur compound of the straight-chain structure is dissolved;

masking regions of the substrate where said perpendicular alignment film is formed and irradiating the masked substrate with light rays;

removing by washing the sulphur compound in the regions that, not being subjected to said masking, are oxidized by said light rays; and forming the horizontal alignment film in the regions where said sulphur compound was removed by immersing the substrate from which said sulphur compound was removed in a solution in which are dissolved either sulphur compounds of the plurality of types of different straight-chain structure or a sulphur compound of the non-straight-chain structure; and forming the liquid crystal layer comprising sealing in liquid crystal material between the substrate that is formed with said perpendicular and horizontal alignment films and the other substrate where alignment processing is performed.

13. The method of claim 9, further comprising:

forming a metallic layer on the surface of at least one of said substrates adjacent said liquid crystal layer;

coating said metallic layer with a photo-resist material and drying;

masking a region on the substrate where said metallic layer is formed above said photoresist material;

irradiating the masked substrate with light rays;

developing and removing the photoresist in a region outside the masked region;

etching and removing said metallic layer in said region that has been subjected to developing and removal; and selectively forming a perpendicular alignment film by immersing the substrate where said metallic layer is selectively formed in a solution in which is dissolved a sulphur compound of the straight-chain structure; and forming the liquid crystal layer comprising sealing in at least liquid crystal material between the substrate where said perpendicular alignment film is selectively formed and the other substrate where alignment processing is performed.

14. A liquid crystal display device comprising:

a pair of substrates formed so as to be capable of sandwiching a liquid crystal layer; and a liquid crystal layer sandwiched between said pair of substrates;

at least one of said substrates includes at least two types of monomolecular films formed with sulphur compound molecules on the surface on a side of said liquid crystal layer, wherein one type of said monomolecular film has a perpendicular alignment formed by sulphur compound molecules of straight-chain structure and is formed on a plurality of regions of said substrate surface; and another type of said monomolecular film has a horizontal alignment formed by either sulphur compounds of a plurality of types of different straight-chain structures or a sulphur compound of non-straight chain structure; and is formed on a plurality of regions of said substrate surface other than the plurality of regions where the perpendicular alignment films are provided; said films are provided to be driven independently electrically within an area of one pixel; wherein the alignments are with respect to the substrate.

* * * * *